United States Patent [19]
Madico

[11] Patent Number: 5,823,392
[45] Date of Patent: Oct. 20, 1998

[54] YOGURT/ CEREAL GRAIN MIXTURE DISPENSING MACHINE

[75] Inventor: Carlos Cano Madico, Lima, Peru

[73] Assignee: Paquetes Especiales S.R.L., Lima, Peru

[21] Appl. No.: 622,336

[22] Filed: Mar. 21, 1996

[51] Int. Cl.[6] .................................................. B67D 5/56
[52] U.S. Cl. ..................... 222/129; 222/146.6; 222/444; 222/453
[58] Field of Search ................................ 222/129, 146.6, 222/185, 444, 448, 453

[56] References Cited

U.S. PATENT DOCUMENTS

| | | | |
|---|---|---|---|
| 4,009,593 | 3/1977 | Davis | 222/146.6 X |
| 4,143,795 | 3/1979 | Casebier | 222/185.1 X |
| 4,168,019 | 9/1979 | Hausam | 222/185.1 |
| 5,139,173 | 8/1992 | Evinger | 222/185.1 |
| 5,421,484 | 6/1995 | Beach | 222/146.6 X |
| 5,464,120 | 11/1995 | Alpers et al. | 222/146.6 X |
| 5,469,988 | 11/1995 | Huang | 222/448 X |
| 5,593,067 | 1/1997 | Shaw et al. | 222/185.1 X |

FOREIGN PATENT DOCUMENTS 688398  3/1965  Italy ....................................... 222/453

*Primary Examiner*—Joseph Kaufman
*Attorney, Agent, or Firm*—Watson Cole Grindle Watson, P.L.L.C.

[57] ABSTRACT

A device for filling cups with yogurt and a portion of corn flakes, kiwicha or similar product, wherein portions of two flavors of yogurt are and measured portions of the selected yogurt and solid food product are dispensed into a cup by the operator.

7 Claims, 3 Drawing Sheets

YOGURT/ CEREAL GRAIN MIXTURE DISPENSING MACHINE

BACKGROUND OF THE INVENTION

The present invention relates to a device for controlled preparation and sale for human consumption of predetermined portions of a mixture of liquid yogurt or yogurt paste with precooked, properly treated cereal grains.

Yogurt is a very well-known product in the marketplace, although it is utilized on a small scale with respect to its pasteurized dairy source, and is characterized by its excellent intestinal antiseptic effect for the treatment of specific gastrointestinal conditions. As a result, it has both nutritional and medicinal uses, and its consumption should therefore be broadened to include children, young people and adults in all segments of the population. Yogurt has not been properly appreciated by the public, due to its slightly tart, sour taste. For this reason yogurt is commonly treated with fruit essences whose flavor and smell predominate over the product's natural flavor and smell, creating a thick drink that is beneficial for the digestive system and has a pleasant taste for the consumer. Commercial technology for the product has reached this point, but it is clear that if the product is combined with pleasant-tasting, precooked and substantially dehydrated solid products that are also nutritious, such mixture or combination will constitute an excellent, easily digestible food that contributes to optimal organic assimilation of the nutritious products.

In view of the foregoing, the need to combine the thick yogurt product with solids, such as precooked and pretreated cereal grains like corn flakes, kiwicha, rice, wheat, etc., to form a pleasant-tasting, easily digestible and highly nutritious food is clear. This must be mechanically produced by precisely measuring the ingredients and, chiefly, avoiding unsanitary handling the ingredients and the resulting product.

SUMMARY OF THE INVENTION

For the reasons set forth above, I have created a device capable of mechanically producing the food in disposable cups or containers from measured quantities of the liquid and solid products, with the option of selecting the specific flavor of yogurt from its two most popular kinds, with the precooked solid product delivered from a separate container.

To meet the needs specified above, the device according to the present invention essentially consists of three separate, properly refrigerated storage tanks, each with its respective supply valve for delivering the product to a front platform. The three parallel compartments are open at the top for continuous refilling with the respective products, and are covered with a shared lid when in service. The solid product compartment (corn, wheat, kiwicha, rice, etc.) is provided with a conical feed hopper and a moveable measuring receptacle for transporting the exact quantity required to the delivery opening located over the outside platform. This functional portion of the device according to my invention may be mounted on a portable base attachment, or mounted directly on the counter of an establishment and connected to a system for refrigerating the compartments and valves.

As such, one purpose of the present invention is to create an automatic device for supplying cups containing the yogurt/precooked cereal grain mixture in predetermined exact proportions under refrigeration.

Another purpose of the present invention is to create a completely enclosed device for dispensing foods in measured quantities, providing it with an accessory base for storing the supplies under refrigeration, if desired, together with the relevant refrigeration unit and its respective control and monitoring mechanism.

Still another purpose of the present invention is to make devices that can be easily disassembled into their sections and parts for daily washing and disinfecting at the desired time.

These and still other advantages can be more easily understood from the attached description and drawings showing, solely as an example, an embodiment of the referenced invention. They are provided for illustrative purposes only and are not intended to restrict the nature and scope set forth in greater depth in the attached respective claims.

DETAILED DESCRIPTION OF THE PREFERRED EMBODIMENT

Figure 1:
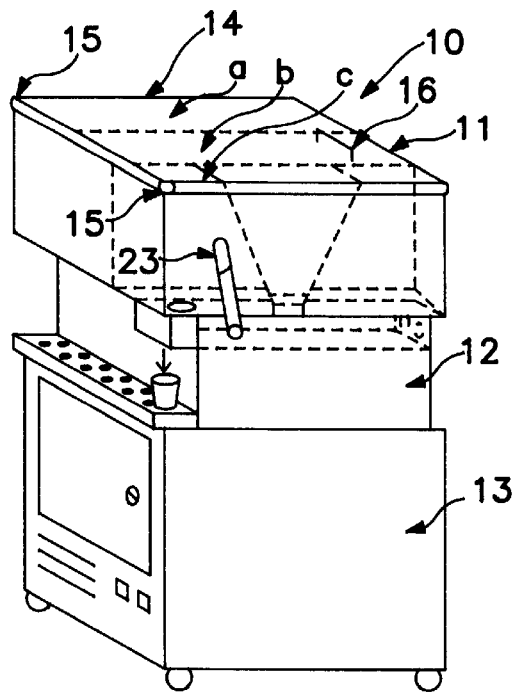
FIG. 1 shows a front perspective view of the first embodiment of a device according to my invention, showing the three sections that comprise it, together with the respective delivery taps for the liquid ingredients and the lever for delivering the solid ingredient.
Figure 2:
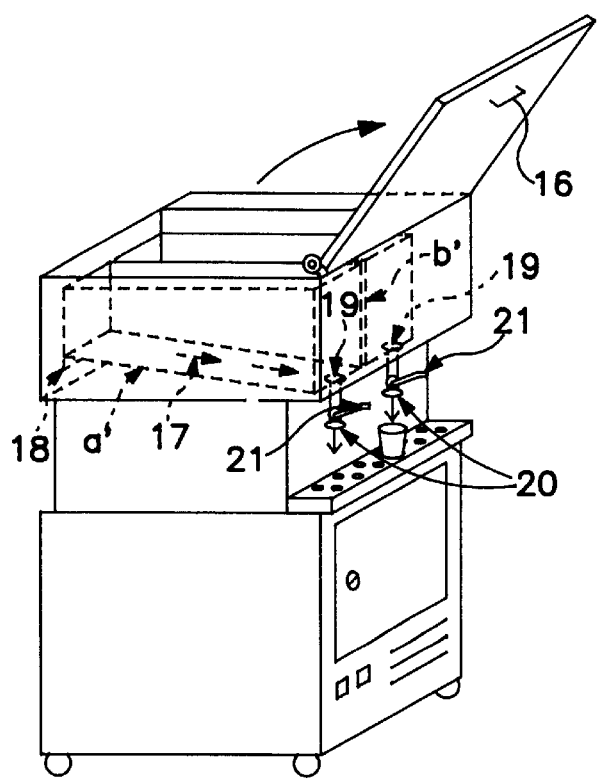
FIG. 2 shows a right perspective view of the same device shown in FIG. 1, with the top lid lifted to reveal the position of the three compartments designed to contain the liquid and solid ingredients of the mixture.
Figure 3:
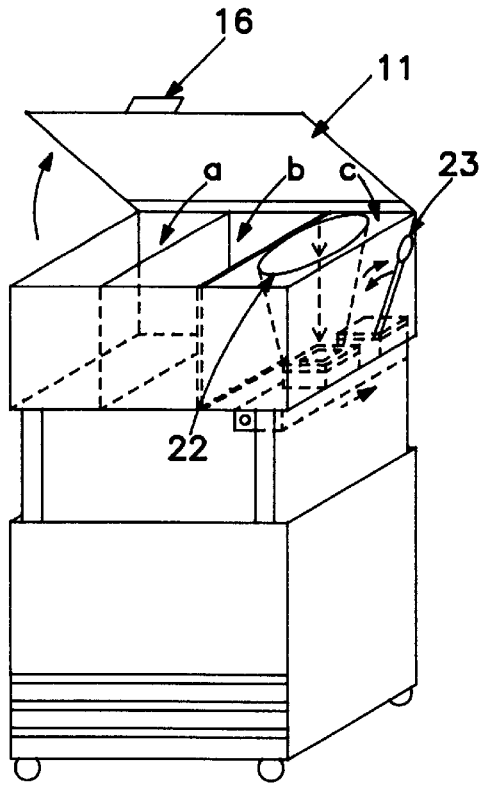
FIG. 3 shows a rear view of a second embodiment of a device according to my invention, with the top lid up to reveal the end compartment used to store the solid ingredient delivered to the food mixture.
Figure 4:
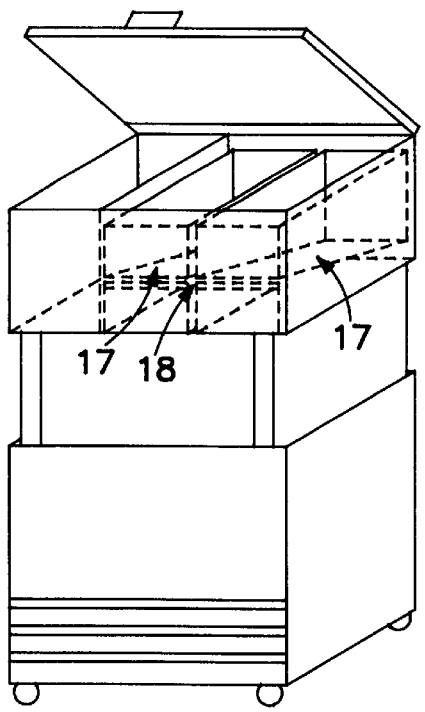
FIG. 4 shows a rear view of the device according to the first embodiment, with its lid up to reveal the position of the two tub bottoms, which are inclined for gravity feeding of the two types of yogurt used, also showing the rear horizontal bar that supports the back wall of such tubs.
Figure 5:
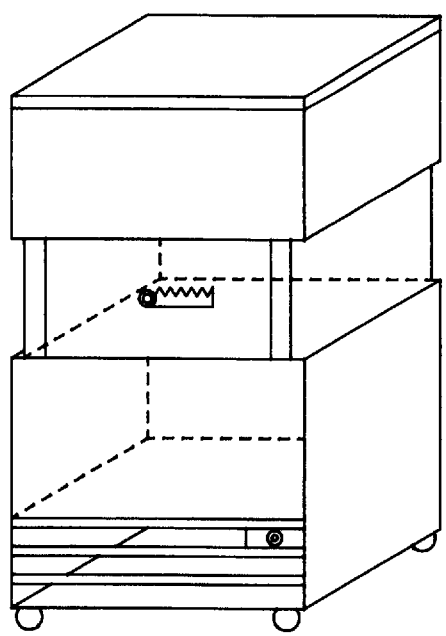
FIG. 5 shows a rear view of the device according to my invention, when fully closed, showing schematically, using dotted lines, the ample space below for storing the containers with the ingredients and the means for connecting and regulating the electric current used for refrigeration.
Figure 6:
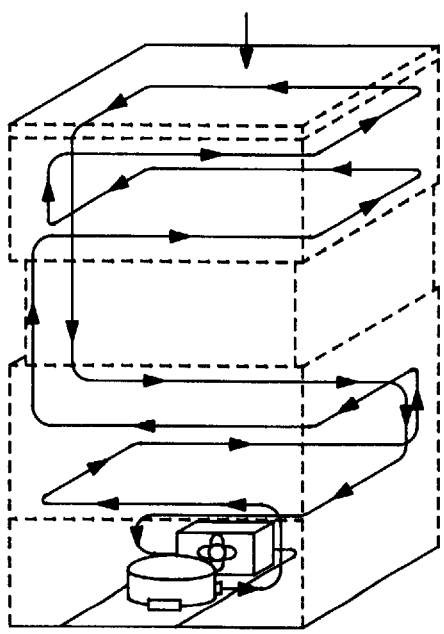
FIG. 6 shows a schematic representation of the refrigeration system, which maintains a stable temperature of between –03 degrees centigrade and 03 degrees centigrade in the drive compartments and the useable product storage compartment.

With reference to the figures, number 10 designates a preferred inventive embodiment of a device for storing a mixture of pastes and solids, such as sweetened and flavored yogurt, and corn flakes, kiwicha, wheat, etc., such device being comprised of an upper section 11, a middle section 12 and a lower section includes a compartment 13 and bottom chamber storage for a refrigeration mechanism and the electric power supply connector.

The upper section 11 has a flat lid, referenced as number 14, which is perfectly fitted to the edge of the section 11 and can be opened from back to front by means of the hinges 15, or is provided with a handle 16, to reveal a cavity divided by parallel partitions a, b and c to form three parallel compartments for the purposes described below. Open-topped, truncated-trapezoidal containers with bottoms that are substantially inclined, such that the thickened liquid inside them always flows toward the front outlet, are placed in two adjacent compartments. For this purpose the smaller base of such tubs rests on a horizontal bar 18, anchored to the rear inside wall of the section 11, Thus, the top of each tub is level and its bottom is inclined, forcing the thickened liquid to flow forward to the holes 19 that feed into the delivery taps 20 operated by the handles 21. Note that such delivery taps 20 are shutoff valves, i.e., a quarter turn opens or closes the outlet for the yogurt that flows down the inclined plane of its respective container.

The compartment for controlled supply of the solids is separate from the other two used for the liquid. Such compartment, as shown on the left side of the device, has an inverted truncated-cone container, the smaller, lower side of which is connected to a tubular cavity that forms a single piece with a sliding steel plate. Whenever the plate, with its respective tubular cavity, is positioned directly below the lower opening of the truncated-cone section, the solid product used is gravity-fed. The action of withdrawing such cavity, when full, blocks the lower opening of the truncated-cone section while said cavity attached to the plate is withdrawn until it is positioned directly above the open outlet in the bottom of the device, emptying into it all the solid product it held. All such product is delivered into the cup placed below the corresponding opening. This filling, moving and, finally, emptying of the solid into the cup set in place by the operator is effected by means of the side lever 23, which converts the angular motion of the lever into linear motion of the plate and its respective measuring receptacle.

Having thus described the essential properties of the present invention and its preferred embodiment, I make the following claims as my exclusive property.

I claim:

1. A stand-alone dispenser apparatus for the storage and controlled dispensing of both flowable and granular edible products which comprises an upright housing that defines a front side, a rear side and opposite left and right sides and which includes an upwardly open upper section, a middle section and a lower section, said middle section defining a shelf at said front side of said housing on which a food container can be positioned, and said upwardly open upper section defining first, second and third parallel compartments which extend from said rear side to said front side of said housing, and including a first flowable product receptacle which is positioned in said first compartment, said first flowable product receptacle including a dispensing means located above said shelf for dispensing a first flowable product into a food container located therebelow; a second flowable product receptacle which is positioned in said second compartment, said second flowable product receptacle including a dispensing means located above said shelf; and a granular product delivery means located in said third compartment, said granular product delivery means including a vertically-oriented funnel hopper, a horizontally-slidable plate with a bore located beneath the funnel hopper and an operating means for sliding said plate so that said bore can be reciprocally displaced from beneath said funnel hopper to above said shelf to deliver a controlled volume of granular product from said funnel to a food container located on or above said shelf.

2. A stand-alone dispenser apparatus according to claim 1, including a hinged lid for covering said upwardly-open upper section.

3. A stand-alone dispenser apparatus according to claim 1, including a refrigeration means for cooling flowable product contained in said first and second compartments.

4. A stand-alone dispenser apparatus according to claim 3, wherein said refrigeration means comprises a compressor located in said lower section and flow piping which conveys coolant from said compressor to said upper section.

5. A stand-alone dispenser apparatus according to claim 1, wherein said operating means comprises a manually-operable handle.

6. A stand-alone dispenser apparatus according to claim 1, wherein said first receptacle contains a first flavored yogurt, said second receptacle contains a second flavored yogurt, and said funnel hopper contains a granular material selected from the group consisting of cereal rice, wheat and kiwicha.

7. A stand-alone dispenser apparatus according to claim 1, wherein each of said first and second flowable product receptacles includes a bottom floor which is downwardly inclined towards said dispensing means.

\* \* \* \* \*

UNITED STATES PATENT AND TRADEMARK OFFICE
CERTIFICATE OF CORRECTION

PATENT NO. : 5,823,392
DATED : October 20, 1998
INVENTOR(S) : Carlos Cano Madico It is certified that error appears in the above-indentified patent and that said Letters Patent is hereby corrected as shown below:

On the title page, item:

[30] Foreign Application Priority Data
March 23, 1995    Peru ............ 264815

Signed and Sealed this

Twentieth Day of April, 1999

Attest:

Q. TODD DICKINSON

Attesting Officer

Acting Commissioner of Patents and Trademarks